United States Patent [19]

Christiansen et al.

[11] Patent Number: 5,046,455

[45] Date of Patent: Sep. 10, 1991

[54] AUTOMATIC ANIMAL FEEDER

[76] Inventors: Steven A. Christiansen, 2345 Franklin Ave.; Phillip G. Christiansen, 1607 Hayes, both of Meeteetse, Wyo. 82433

[21] Appl. No.: 628,454

[22] Filed: Dec. 17, 1990

[51] Int. Cl.⁵ .............................................. A01K 5/00
[52] U.S. Cl. ..................................... 119/56.1; 222/444
[58] Field of Search .............. 119/51.11, 51.12, 52.1, 119/53, 56; 222/434, 438, 440, 444, 445, 450, 451, 452

[56] References Cited

U.S. PATENT DOCUMENTS

| | | | |
|---|---|---|---|
| 1,749,056 | 3/1930 | Albrecht | 119/56.1 X |
| 2,793,791 | 5/1957 | Clark | 119/56.1 X |
| 3,762,373 | 10/1973 | Grossman | 119/56.1 X |
| 4,422,409 | 12/1983 | Walker et al. | 119/51.11 |
| 4,522,152 | 6/1985 | Meyer | 119/56.1 |

FOREIGN PATENT DOCUMENTS

| | | | |
|---|---|---|---|
| 742308 | 7/1980 | U.S.S.R. | 222/440 |
| 993293 | 5/1965 | United Kingdom | 119/56.1 |

*Primary Examiner*—Gene Mancene
*Assistant Examiner*—R. Thomas Price
*Attorney, Agent, or Firm*—Douglas M. Clarkson

[57] ABSTRACT

An automatic feeder for animals and the like is described as having a hopper for storing food to be dispensed. A food measuring compartment is located beneath the hopper and is formed with various adjustable partitions for selecting an amount of food to be dispensed. Different structures are described for controlling the opening and closing of two openings, one for discharging food from the hopper into the food measuring compartment and a second opening for dispensing measured food from the compartment. An electric motor controls the structures to open and close the two openings.

20 Claims, 4 Drawing Sheets

AUTOMATIC ANIMAL FEEDER

BACKGROUND OF THE INVENTION

1. Field of the Invention

The present invention, generally, relates to animal feeder devices and, more particularly, to devices for feeding animals automatically at preselected time intervals.

Owners of pets and livestock are burdened with the responsibility of continually providing food and water for animals under their care. The lack of a reliable means to provide food and water for pets and livestock automatically has caused pet and livestock owners to provide alternate personnel to perform the feeding and watering function when the owners are not available to do so themselves or to board the pets and livestock at appropriate facilities, often at considerable expense.

Previous automatic animal feeding devices have tended to be excessively complex and, therefore, prone to malfunction which can contribute to the possible starvation or dehydration of pets and livestock. These prior devices also are not sufficiently versatile to permit easy and rapid adjustment of the quantity of animal food to be dispensed nor adjustment of the time interval between each feeding. Therefore, none of the prior animal feeding devices has solved this problem satisfactorily.

2. Description of the Prior Art

Many different types of automatic animal feeders are already known. For example, U.S. Pat. No. 4,235,200 to Michael A. Shay, that issued Nov. 25, 1980, discloses an automatic animal feeder with a pivotable chamber. A solenoid, when actuated by a timer apparatus, pivots the chamber to a food delivery position. The chamber has an arcuately shaped front panel in contact with an arcuately shaped housing.

The device that is disclosed in U.S. Pat. No. 4,437,595 which issued Mar. 20, 1984, to Perry Stevens et al., has a reciprocating slide member actuated by an adjustable throw solenoid to dispense animal food as determined by a timer.

U.S. Pat. No. 4,782,790 to Dalton B. Batson, which issued Nov. 8, 1988, discloses a device that utilizes a hopper with a gated side aperture and an endless conveyor belt. An electronic control actuates a solenoid to raise and lower a food gate to periodically engage a conveyor belt drive motor.

U.S. Pat. No. 4,324,203 to Arthur B. Chiappetti, that issued Apr. 13, 1982, discloses a mechanism with receptacles on a rotatable member that conveys the receptacles, with their contents, to a discharge location. The mechanism uses a motive force to turn the rotatable member at a fixed rate of one revolution every twenty four hours. The interval between each feeding is controlled by the number of receptacles on the rotatable member.

U.S. Pat. No. 4,763,810 to Lee T. Christiansen, that issued Aug. 16, 1988, discloses an apparatus for dispensing medication to human patients on a regular basis. It consists of a plurality of medication holding compartments, each having an open bottom. An endless belt with a hole dispenses the medication by moving and stopping periodically when the hole is under a compartment, according to a microprocessor that is programmed for each patients needs.

The structural arrangements of these prior art devices differ in material respects from the present invention. These differences will be more apparent as the description proceeds, as will the several advantages to which a structure according to the present invention admits.

OBJECTS AND SUMMARY OF THE INVENTION

It is an important object of the present invention to provide a reliable means of automatically dispensing food periodically to pets and livestock.

Another object of the invention is to provide a means of controlling the quantity of food to be released at each dispensation.

Still another object of the present invention is to provide a means of controlling the time interval between each food dispensation.

Yet another object of the invention is to provide a means for periodically performing auxiliary functions, such as to replenish a supply of water or medication.

A further object of the invention is to reduce the overall complexity and the number of moving parts of automatic animal feeding apparatus in order to provide a device that is foolproof as possible.

Briefly, an animal feeder that is constructed in accordance with the principles of the present invention embodies a food storage hopper above an intermediate surface that is movable first over a variable size food compartment and, then, under the food compartment. The movable surface has at least one opening that periodically passes both over the food compartment and, later, under the food compartment.

When the opening is over the food compartment, food from the food storage hopper fills the compartment to the selected volume. As the intermediate surface moves further, the opening moves away from the top of the compartment, thereby sealing the hopper. When the intermediate surface moves still further, the opening is brought under the food compartment, thereby releasing the food automatically.

The above and other objects, advantages and features of the present invention will become more readily apparent from the following detailed description, taken in conjunction with the accompanying drawings.

DETAILED DESCRIPTION OF THE INVENTION

Figure 1:
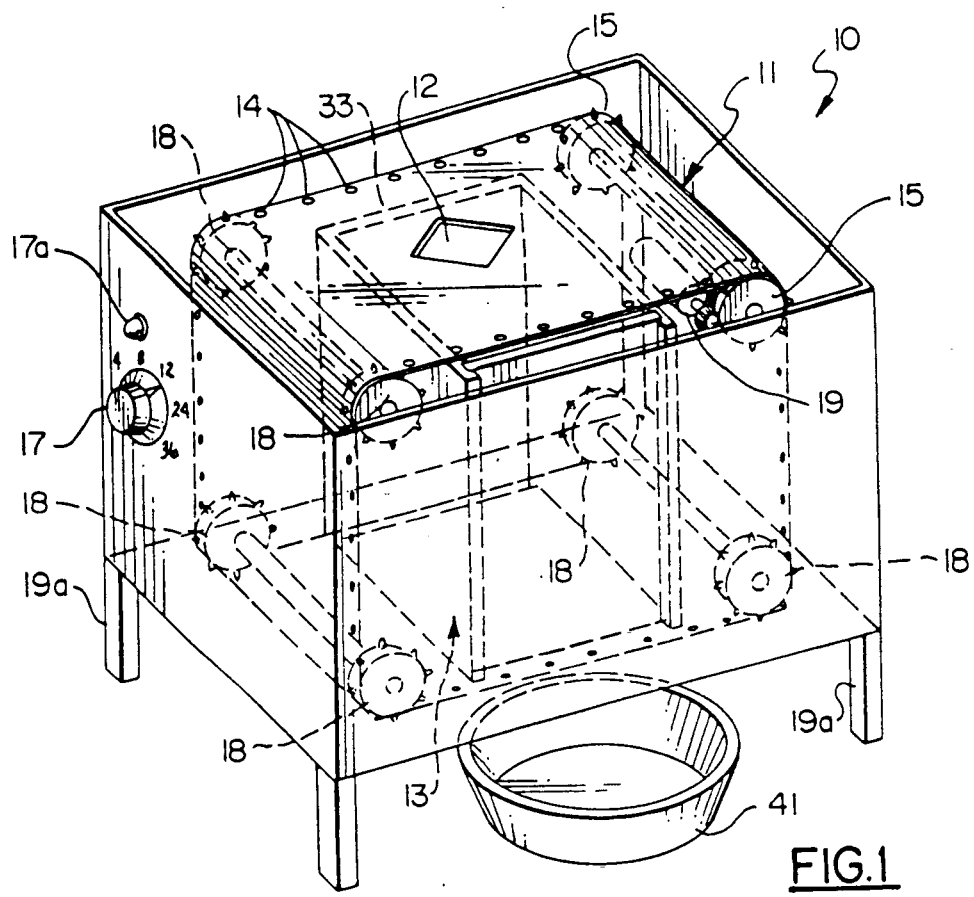
FIG. 1 is a perspective view of a preferred form of an automatic animal feeder that is constructed and arranged in accordance with the present invention.

Referring to FIG. 1, the present invention includes an enclosure 10 elevated by support legs 19a to a desired height. A purpose of this height is to permit food dispensed by the arrangement of the invention to be by gravity, as will be described in more detail presently.

Inside the enclosure 10 is a continuous belt 11, forming an intermediate surface, with sprocket holes 14 located along opposite edges of the belt 11. The enclosure 10 provides a relatively safe and sheltered environment for the various components of the invention and the food to be dispensed.

Sprocket drive wheels 15 engage the holes 14 to move the belt 11, by a variable speed motor 19, whose speed is set and regulated by a potentiometer 17. The potentiometer 17 has settings (i.e., 24 hours, 12 hours, 8 hours) which indicate either the time interval between each dispensing of food or, in an alternate embodiment, the time from a reference time until the next dispensation of food.

Idler wheels 18 are located to maintain the continuous belt 11 in the position shown in FIG. 1 by keeping the belt 11 under tension so that it forms a substantially flat surface above and below a food measuring compartment 13. The continuous belt 11 has an opening 12 which is any suitable size and configuration, but a diamond shape is preferred because it functions best with granular animal food without jamming.

Figure 2:
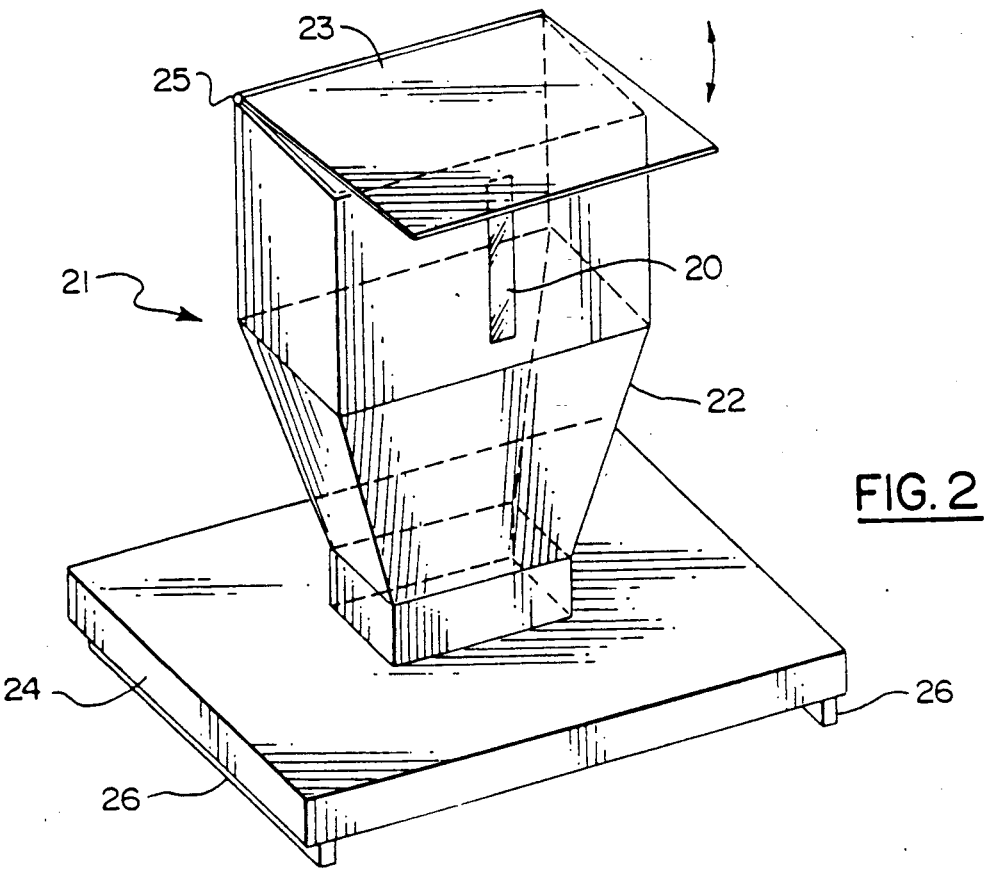
FIG. 2 is a perspective view of a food storage hopper in accordance with the invention.

In FIG. 2, a feed hopper 21 stores food to be dispensed and includes a funnel shaped chute 22 to limit the food bearing area on the top of the belt 11 and to direct the food in a controlled manner. At least one surface of the hopper 21 contains a transparent rectangular window 20 which provides a visual indication o the amount of food remaining in the hopper 21.

A lower surface 24 of the hopper 21 forms a lid when placed directly over the top of the enclosure 10, FIG. 1. There are strips 26 on the under side of the surface 24, as viewed in FIG. 2, that fit within the top opening of the enclosure 10 to keep the surface 24 and the hopper 21 from slipping or being knocked out of position.

Another lid 23 covers the top of the feed hopper 21 to protect food and is pivotable by means of a hinge 25. The lid 23 is held in a closed position by any means desired, but it has been found that its own weight is sufficient to prevent access, such as by mice, pets and livestock, to the food that is contained in the hopper 21, particularly with a slight overhang, as shown in the drawings.

Referring again to FIG. 1, as the food bears upon the continuous belt 11, eventually the belt 11 moves sufficiently far to bring the belt opening 12 into proximity under the feed hopper 21. When the opening 12 aligns with the top of the food compartment 13, food falls from the hopper 21 through the opening 12 and into the food measuring compartment 13.

Figure 3:
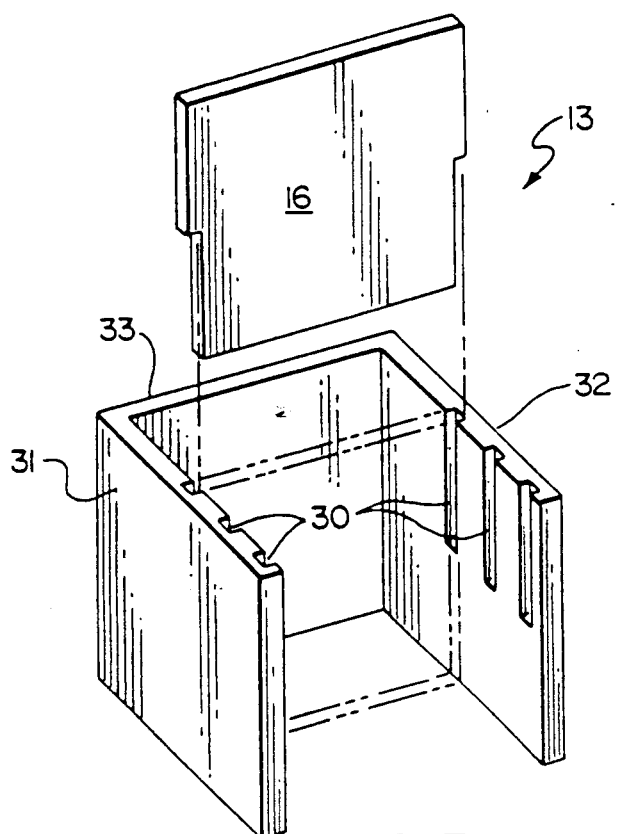
FIG. 3 is a perspective view of a variable size food compartment according to the invention.

With the opening 12 diamond shaped, it has been found that there is almost never a jam due to particles of food acting against the belt 11 after filling the compartment 13. It seems that the edges of the opening 12 being slanted, tend to cut through food particles separating them up or down in a parting manner, due to the "V" shaped opening collecting only one or two food particles at the bottom of the "V". Also, the location of the opening 12 is placed so that it is over the compartment 13 when a partition 16 (FIG. 3) is arranged for the smallest size for the compartment 13, as shown in FIG. 3.

The compartment 13 is open to the belt 11 at both the top and the bottom. However, food entering the top of the compartment 13 through the opening 12 does not fall out of the bottom of the compartment due to that portion of the belt being solid at that time in its cycle of movement. Food is not dispensed until the opening 12 reaches the bottom of the compartment 13. At that time, the food in the compartment falls through the opening 12 at the bottom (the top of the compartment now being sealed by the solid portion of the belt) and into either a chute 45, FIG. 4, or into a dish 41, FIG. 1.

The slidable partition 16 regulates the volume of the food compartment 13 and, therefore, the amount of food to be dispensed. The partition 16 fits in a sliding engagement in slots 30 in the surfaces of walls 31 and 32 of the compartment 13, and since the bottom of the compartment 13 is open, the slots 30 extend down only a limited distance so that the partition 16, which has an extension only on its uppermost edges, stops at the bottom of the slots 30. The rear wall 33 of the variable size compartment 13 is secured to one of the panels that form the enclosure 10.

Figure 4:
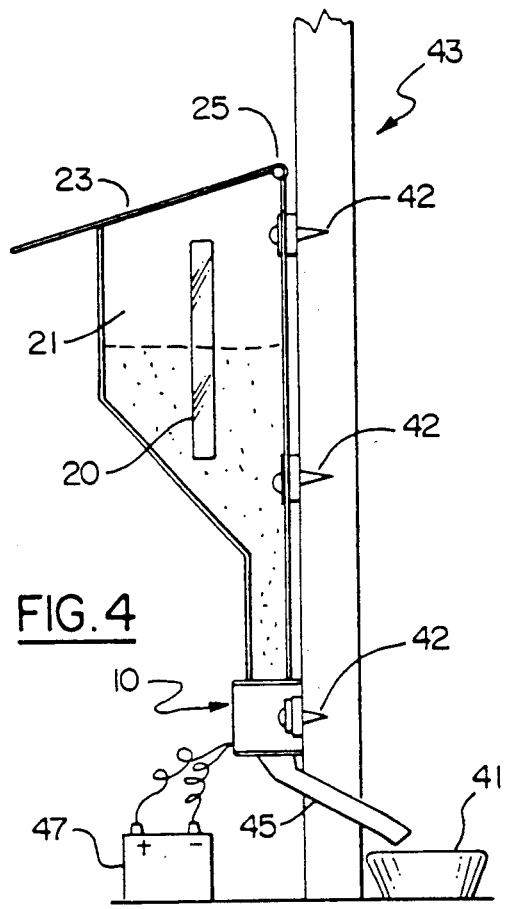
FIG. 4 is a side view of a remotely located food storage hopper assembly according to one aspect of the invention.

Referring now to FIG. 4, the feed hopper 21 is located remotely relative to the food dispensing area and is separated by a barrier wall 43. The feed hopper 21 is secured by suitable means, such as by screws 42, to the barrier wall 43, which wall could be a chain link fence, if desired.

The protective lid 23 is attached to the feed hopper 21 by the hinge 25, like that described in connection with FIG. 2. A transparent rectangular window 20 reveals the amount of food remaining in the feed hopper 21, also like that in FIG. 2.

The enclosure 10 is similarly attached to the barrier wall 43 by screws 42. As an alternative to directly attaching the enclosure 10 to the barrier wall 43, the enclosure 10 may be elevated by the use of support legs 19a (FIG. 1).

A discharge chute 45 conveys food being dispensed from the bottom of the food compartment 13, through the barrier wall 43, to a remote feeding container 41. As such, the principal components of the present invention are located in an area that is protected from the environment, and the food is protected from premature enjoyment by pets and livestock. The discharge chute 45 is any length and configuration that is needed, depending upon a particular installation, to direct movement of animal food downwardly under the influence of gravity.

Of course, there are aspects of the present invention that can be altered to achieve particular suitability in any desired application. For example, a backup storage battery 47 can be connected to continue normal operations in the event of an electrical power failure.

Also, control of the continuous belt 11 can be placed under a program for a microcomputer. For example, the microcomputer can be programmed to dispense all remaining food rapidly should the power failure continue beyond a reasonable time period.

Figure 5:
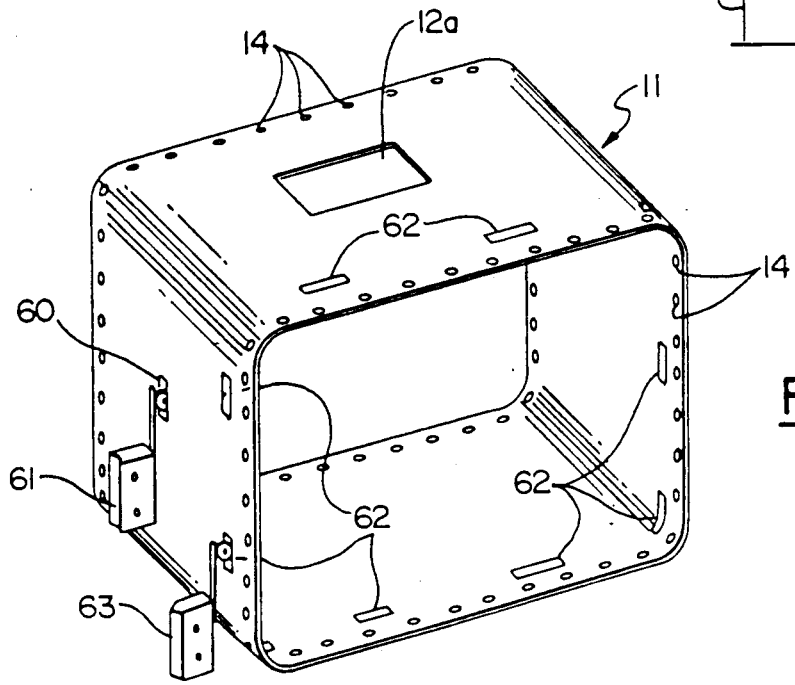
FIG. 5 is a perspective view of an intermediate surface that is a part of the arrangement of the invention.

Referring to FIG. 5, a detailed view of the continuous belt 11 shows a modified belt opening 12a for filling the variable size food measuring compartment and, then, for dispensing the food. Any number of belt openings 12 can be formed in the continuous belt 11 to increase the frequency of the feedings, and as described above, each opening can readily be formed any size and configuration to fit a particular need, within the scope of the present invention.

A plurality of parallel rows containing one or more belt openings 12 is a possible variation in the construction of the continuous belt 11. By segregating the feed hopper 21 into a similar plurality of compartments, with each segregated compartment having a funnel section 22 to direct food to bear only on one of the parallel rows of belt openings, it becomes possible to dispense several amounts of food at various preselected times in accordance with the relative position and number of the belt openings 12 in the continuous belt 11.

The sprocket holes 14 are included on both sides of the belt 11 in the presently preferred embodiment to ensure a smooth movement of the belt 11 during automated feeding operations. A reference hole 60 is provided for use during setup as an aid in determining with greater precision when food is to be dispersed.

The enclosure 10 contains a potentiometer 17 for adjusting the interval, in hours, between each feeding. When the potentiometer is rotated to a more rapid advance position, the variable speed motor 19 advances the belt 11 more quickly.

When the reference hole 60 aligns over a micro switch 61, or between a light source and a phototransistor (not shown), an indicator light 17a is illuminated, FIG. 1. While the indicator light 17a is illuminated, the potentiometer 17 is adjusted to select the amount of time between each feeding, according to a preselected time schedule.

When the indicator light 17a is illuminated, the meaning of the time schedule is absolute relative to the present time. This is because the position of the belt opening 12a of the belt 11 is fixed relative to the position of the reference hole 60. Therefore, the position of the opening 12a becomes established, and the time when the next feeding is to occur can be set in accordance with the time schedule that is preselected.

The time interval until the next feeding, therefore, becomes a function simply of the speed of movement of the belt 11. As such, the amount of time from the present time, in hours, until the next feeding, is set by adjusting the potentiometer 17. The use of a reference hole 60 and an indicator light 17a provides a means of establishing absolute feeding times.

A series of auxiliary openings 62 is arranged in the belt 11 in any number of parallel rows, each row containing any number and shape of these openings. The motion of each auxiliary opening 62 is detected by the use of an auxiliary micro switch 63 or by a phototransistor (not shown) similar to that used to determine the location of the reference hole 60.

The purpose of the auxiliary openings 62 is to provide a means to perform additional tasks, such as providing water to pets and livestock or by sounding a feeding bell (not shown) prior to dispensing food. The output of any possible means employed to determine the position of the auxiliary openings 62 is connected to a relay, solenoid or to other optional components, which can be located either internal or external of the enclosure 10.

Similarly, the microcomputer can be programmed to activate a telephone dial-out option and call for manual assistance in the event of a power outage or an internal component failure. A clock, display, and keyboard (not shown) can be incorporated for use with a microcomputer controlled embodiment of the present invention as an aid in setup and usage by the operator.

Figure 6:
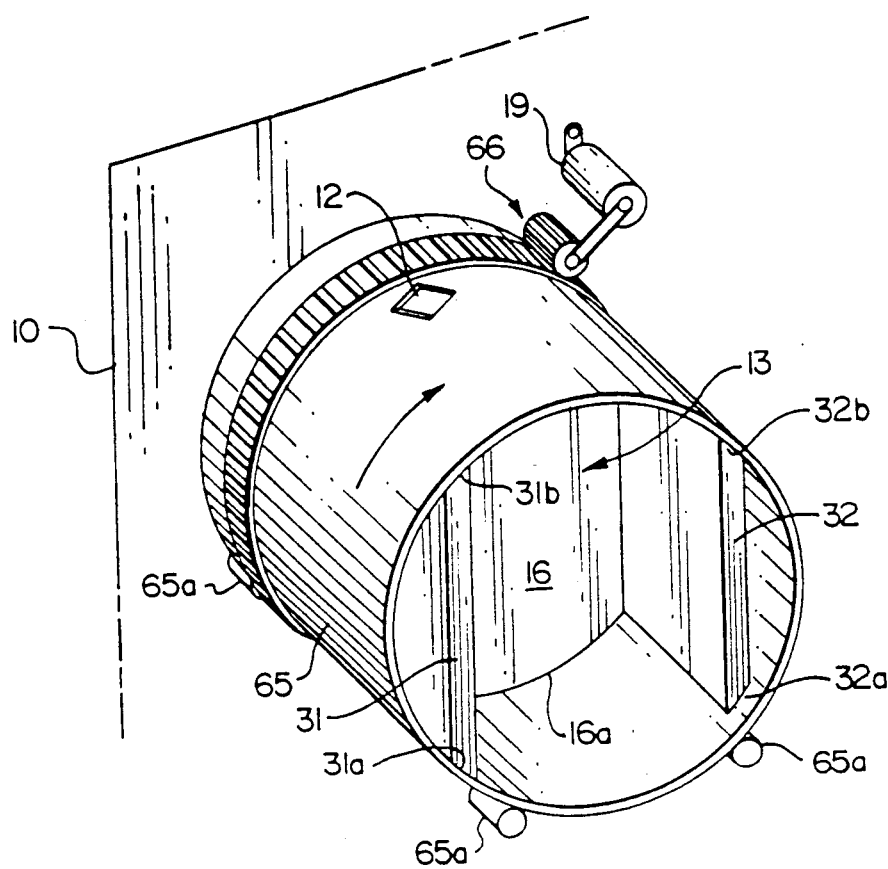
FIG. 6 is a view in perspective of a modified form of the intermediate surface for controlling food dispensing.

In FIG. 6, a modified form of the intermediate surface, that is provided by the endless belt 11 in FIG. 1, is formed by a cylinder 65. In this view, as throughout the description, similar or comparable component parts are identified by the same reference numeral.

The cylinder 65 has at least one opening 12, like the opening 12 in the belt 11 in FIG. 1, but since the cylinder 65 is formed of substantially more rigid material, it is self supporting. Therefore, the cylinder 65 is rotatable on a suitable bearing either on the rear surface of the enclosure 10, not visible in this figure, or preferably, the cylinder 65 is supported for rotation on four rollers, three of which are visible in FIG. 6 and are identified by the reference numeral 65a.

To turn the cylinder 65 on its bearing support, a motor 19 is supported on the same rear surface of the enclosure 10 and is connected to the cylinder 65 by a suitable drive gear arrangement 66, which is designed to turn the cylinder 65 in a predetermined manner, depending upon a particular installation. For example, it can be arranged and connected to turn the cylinder 65 slowly a preset number of revolutions in a given period of time, such as once every 12 hours, or it can turn the cylinder 65 in a prearranged step fashion.

The food metering, or measuring, compartment 13 in the modification of FIG. 6 is like that of FIG. 3, except that the ends of the walls 31 and 32 as well as the upper and lower edges of the partition 16 must be curved to match the curved inner surface of the cylinder 65. Visible in this figure are the lower ends 31a and 32a of the walls 31 and 32, respectively.

Similarly, the upper ends (or edges) 31b and 32b of the walls 31 and 32, respectively, are curved to match the curved inner surface of the cylinder 65. Also visible in this figure is the lower edge 16a of the partition 16, and it shows this edge as being curved like the inner surface of the cylinder 65.

Figure 7:
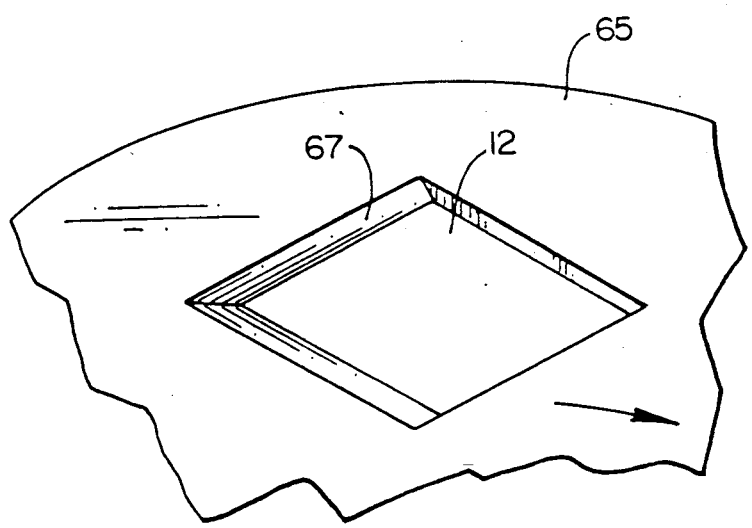
FIG. 7 is an enlarged view of one form of opening in the intermediate surface through which food is to pass.

In FIG. 7 of the drawings, the trailing edges of the opening 12 are inclined edges 67, as described previously hereinabove, to prevent a tendency to jam against particles of food. By forming the trailing edges as inclined edges 67, individual particles of food are either cut, or they are urged out of the path of the moving intermediate surface.

Figure 8:
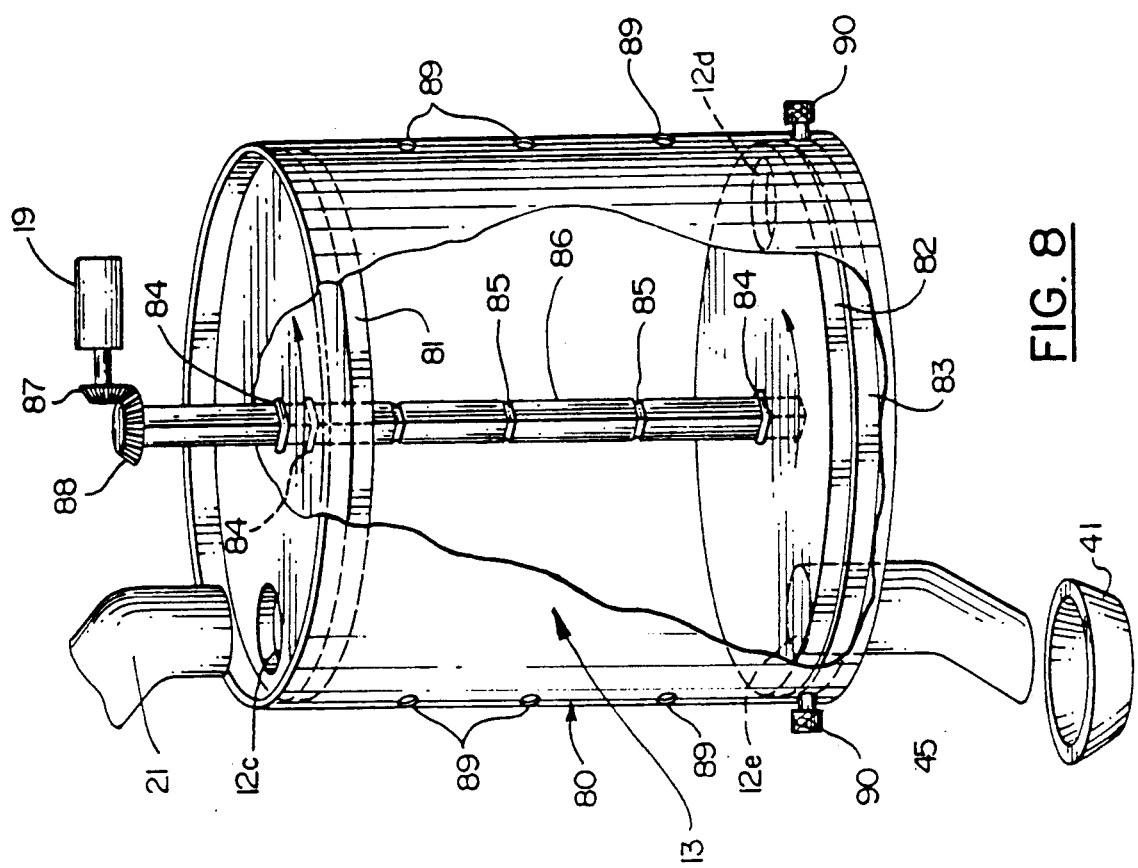
FIG. 8 is a perspective view of a modification of the food measuring compartment of the invention.

In FIG. 8, a modified form of the present invention, that is provided by the endless belt 11 in FIG. 1, and by the cylinder 65 in FIG. 6, is formed by two intermediate surfaces as created by an upper disk plate 81 and a lower disk plate 82. The upper disk plate 81 forms an intermediate surface between a feed hopper 21 and the food measuring compartment 13. The upper disk plate 81 contains an upper disk opening 12c.

The lower disk plate 82 contains a lower disk opening 12d. Both the upper disk plate 81 and the lower disk plate 82 have a substantially square opening at their respective centers formed to fit snugly over a square shaft 86. The square shaft 86 is connected to a driven gear 88 that engages a drive gear 87 rotated by the variable speed motor 19.

As the square shaft 86 turns, both the upper disk plate 81 and the lower disk plate 82, are rotated simultaneously. A fixed plate 83 is stationary within the outer cylinder 80.

Threaded knurled bolts 90 pass through clearance holes 89 in the outer cylinder 80 for threading directly into holes in the edge of the fixed plate 83. The outer cylinder 80 is supported by the enclosure 10, not visible in this view, and does not rotate.

The clearance holes 89 are of sufficient number, at least 3 is preferred, and location to support the fixed plate 83 at several predetermined positions to determine the size of a compartment 13 for measuring the amount of food to be dispensed. Of course, the clearance holes are very small and do not permit significant leakage of food.

A modification of the invention permits these clearance holes 89 to be scored outlines only for opening, as with a small nail, during an initial setup, and later, when the position of the fixed plate 83 is to be changed, the unused clearance holes 89 are covered with a small piece of tape.

The upper disk plate 81 is fixed vertically to the square shaft 86, and by the arrangement described above, the lower fixed plate 83 is adjustable vertically on the square shaft 86 by the bolts 90 and provides support for the lower disk plate 82. The center hole of the lower fixed plate 83 is sufficiently large to provide clearance for the rotating square shaft 86.

A groove 85 is formed at spaced apart intervals along the length of the square shaft 86. A clip 84 fits in the grooves 85 to support and secure in place each of the disk plates 81 and 82.

The bottom surface of the lower disk plate 82 is supported by a fixed plate 83 which is raised or lowered in accordance to the selected position of the lower disk plate 82. The cylinder holes 89 are located along the perimeter of the outer cylinder 80 to provide support for the fixed plate 83 at the proper elevation.

The center of the fixed plate 83 is formed in a circle that does not engage nor interfere with the rotation of the square shaft 86. The lower disk plate 82 and fixed plate 83 are raised and lowered within the outer cylinder 80 to change to volume of space that is present between the upper disk plate 81 and the lower disk plate 82.

This variable volume of space defines the food measuring compartment 13 and therefore, serves to regulate the amount of food to be dispensed at each feeding occurrence. In use, the square shaft 86 rotates the upper disk plate 81 within the outer cylinder 80 causing the upper disk opening 12c to rotate.

When the upper disk opening 12c aligns with the feed hopper 21, food falls from the feed hopper 21 through the upper disk opening 12c and fills the food measuring compartment 13. The lower disk opening 12d does not, at this time, align with the dispensing hole 12e in the fixed plate 83.

Therefore, the food, contained in the food measuring compartment 13, is held captive. The upper disk opening 12c continues to rotate and, eventually, seals the feed hopper 21 preventing additional food from falling out of the feed hopper 21 and into the food measuring compartment 13.

As the square shaft 86 continues to turn, the opening 12d becomes aligned with the food dispensing hole 12e, and now, food is dispensed into the chute 45 for being received in the food dish 41.

Figure 9:
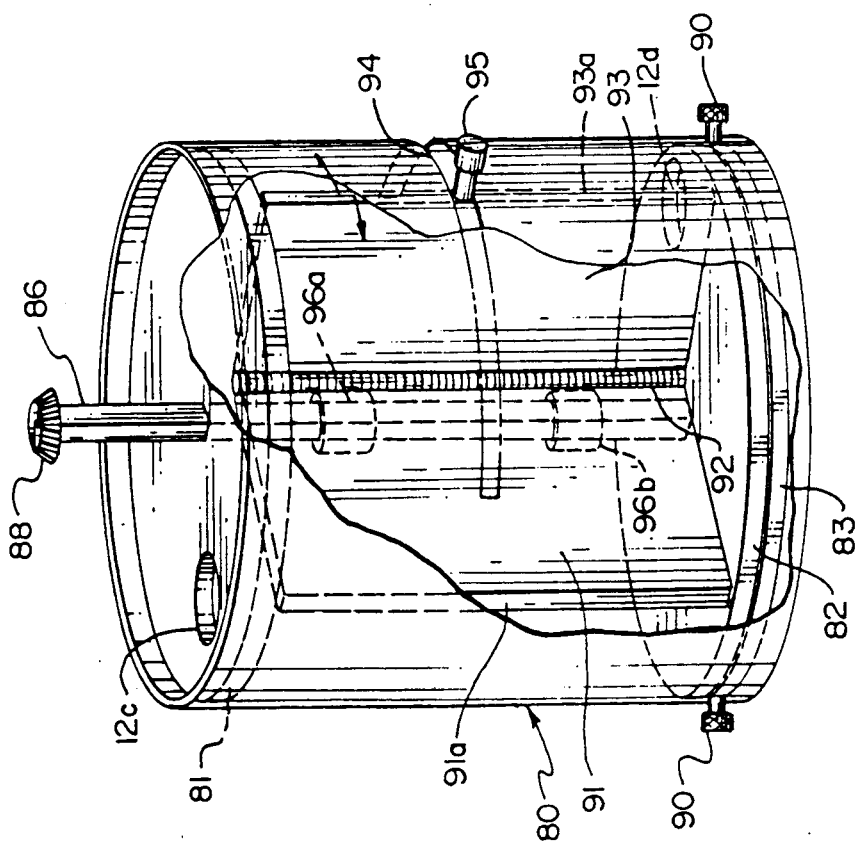
FIG. 9 is a view in perspective of a modification of the food measuring compartment shown in FIG. 8.

FIG. 9 shows a further modification of the invention. The outer cylinder is identified by the reference numeral 80, as previously, and within the cylinder 80, a modified structure is shown to adjust the volume for measuring the food to be dispensed. A fixed plate 91 is attached to the inner surface of the cylinder 80 along the edge 91a and, along its opposite edge, to a hinge 92.

As seen in FIG. 9, the hinge 92 is in front of a square shaft 86 and is maintained in this position by two clearance rings 96a and 96b. The clearance rings 96a and 96b are attached to the hinge 92 but fit with a small clearance about the square shaft 86.

A movable plate 93 is similar to the fixed plate 91 but the edge 93a adjacent the inner surface of the cylinder 80 is adjustable in position, and the opposite edge is attached to the hinge 92. A small, elongated slot 94 in the cylinder 80 permits a knob 95 to be threaded in the edge 93a of the movable plate 93 for tightening, thereby adjusting the volume defined between the two plates 91 and 93.

The invention has been shown, described and illustrated in substantial detail with reference to a presently preferred embodiment, and several modifications have been described. It will be understood by those skilled in this art that various changes and further modifications can be made without departing from the spirit and scope of the invention which is defined by the appended claims.

What is claimed is:

1. An automatic feeder for animals and the like, comprising:
    storage means to enclose a predetermined amount of material for dispensing by gravity at a predetermined time and in a predetermined amount;
    said storage means including means for directing said material to be dispensed in a predetermined direction terminating in a discharge opening having a preselected size and configuration;
    movable surface means located to normally seal said discharge opening, and including a hole means permitting said material discharged through said discharge opening and said movable surface means when said surface means is moved in a predetermined manner;
    material measuring compartment means located in a fixed position under said discharge opening for metering a preset amount of said material when said movable surface means is moved in said predetermined manner, said compartment means having an opening for receiving said material at a first position and an opening for dispensing said material at a second position; and
    said movable surface means including means for normally sealing said compartment means opening at said second position, and including means for moving said hole means to said second position permitting said preset amount of said material to be dispensed;
    whereby said material is moved automatically from said storage means to said measuring compartment means when said movable surface means is moved in said predetermined manner; said movable surface means then sealing said storage means, and said movable surface means then moving from said position of sealing said compartment means opening at said second position for permitting material within said compartment means to be dispensed through said opening at said second position and through said hole means.

2. An automatic feeder as defined by claim 1 including electric motor means connected to move said surface means in said predetermined manner.

3. An automatic feeder as defined by claim 2 including means connected with said electric motor means for controlling a preset speed of movement of said movable surface means.

4. An automatic feeder as defined by claim 2 wherein said movable surface means is an endless belt having sprocket holes for moving by a sprocket drive connected to said electric motor means.

5. An automatic feeder as defined by claim 4 including sprocket idler wheels located for directing said endless belt over said material measuring compartment means for sealing said discharge opening and under said material measuring compartment means for sealing said opening for dispensing said material at said second position.

6. An automatic feeder as defined by claim 5 wherein said hole means in said movable surface means defines a substantially diamond shaped hole for unsealing said discharge opening.

7. An automatic feeder as defined by claim 6 including enclosure means for enclosing said storage means, said movable surface means, and said material measuring compartment means.

8. An automatic feeder as defined by claim 6 wherein said hole means includes relatively sharp edges at least at predetermined portions of said hole means.

9. An automatic feeder as defined by claim 1 wherein said storage means is in the form of a hopper, and said means for directing said material is in the form of a chute terminating in said discharge opening.

10. An automatic feeder as defined by claim 1 wherein said material measuring compartment means is adjustable in size for metering said predetermined amount of said material.

11. An automatic feeder as defined by claim 1 wherein said movable surface means is in the form of a cylinder supported rotatably for moving said hole means selectively in a preselected manner.

12. An automatic feeder as defined by claim 11 including means for supporting and rotating said cylinder means in said preselected manner.

13. An automatic feeder as defined by claim 12 wherein said material measuring compartment means is adjustable in size for metering said predetermined amount of said material.

14. An automatic feeder as defined by claim 13 wherein said material measuring compartment means includes walls with edges that match said cylinder means in curvature for substantially sealing said openings at said first and second positions.

15. An automatic feeder as defined by claim 13 including electric motor means connected with said cylinder means for rotating in said preselected manner.

16. An automatic feeder as defined by claim 12 wherein said cylinder support means includes means for turning about an axis coextensive with the major axis of the cylinder means.

17. An automatic feeder as defined by claim 16 wherein said axis for turning said cylinder means is positioned horizontally.

18. An automatic feeder as defined by claim 16 wherein said axis for turning said cylinder means is positioned vertically.

19. An automatic feeder as defined by claim 18 including electric motor means connected with said cylinder means for turning said cylinder means about said vertically positioned axis.

20. An automatic feeder for animals and the like, comprising:
   storage means for enclosing food in a predetermined form for dispensing by gravity at a predetermined time and in a predetermined amount;
   said storage means being of a hopper like configuration with a larger volume at an upper portion and narrowing at a lower portion to a discharge opening;
   cylinder means including at least two hole means opening externally of said cylinder means and including means within said cylinder means defining an adjustable volume compartment means for receiving said food through a first of said two hole means for measuring said predetermined amount of food and for dispensing said predetermined amount of food through a second of said two hole means at said predetermined time; and
   means for turning said cylinder means in a predetermined manner;
   whereby said first of said two hole means is opened when said second of said two hole means is closed for receiving said food from said storage means, said turning resulting in said first of said two hole means being closed and said second of said two hole means being opened for dispensing said measured food.

* * * * *